United States Patent
Park et al.

(10) Patent No.: US 9,420,178 B2
(45) Date of Patent: Aug. 16, 2016

(54) THERMAL AND POWER MANAGEMENT

(71) Applicant: QUALCOMM Incorporated, San Diego, CA (US)

(72) Inventors: Hee Jun Park, San Diego, CA (US); Sumant Madhav Paranjpe, San Diego, CA (US); Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 163 days.

(21) Appl. No.: 14/322,746

(22) Filed: Jul. 2, 2014

(65) Prior Publication Data
US 2015/0181117 A1    Jun. 25, 2015

Related U.S. Application Data

(60) Provisional application No. 61/919,543, filed on Dec. 20, 2013.

(51) Int. Cl.
  *H04N 5/232*  (2006.01)
  *H04N 5/63*   (2006.01)

(52) U.S. Cl.
  CPC ....... *H04N 5/23241* (2013.01); *H04N 5/23216* (2013.01); *H04N 5/63* (2013.01)

(58) Field of Classification Search
  CPC . H04N 5/63; H04N 5/23216; H04N 5/23241; G06F 1/26; G06F 1/3206
  See application file for complete search history.

(56) References Cited

U.S. PATENT DOCUMENTS

| | | |
|---|---|---|
| 2010/0225779 A1 | 9/2010 | Muukki |
| 2011/0249073 A1 | 10/2011 | Cranfill et al. |
| 2012/0179303 A1 | 7/2012 | Anderson et al. |
| 2012/0262592 A1 | 10/2012 | Rabii |
| 2013/0004071 A1 | 1/2013 | Chang et al. |
| 2013/0039431 A1 | 2/2013 | Bae |
| 2013/0182130 A1 | 7/2013 | Tran |
| 2013/0283073 A1 | 10/2013 | Jeganathan et al. |
| 2014/0149753 A1* | 5/2014 | Park ................. G06F 1/206 713/300 |
| 2014/0245033 A1* | 8/2014 | Grokop ............. G06F 1/3206 713/300 |
| 2014/0359324 A1* | 12/2014 | Park ................. G09G 5/00 713/320 |

(Continued)

FOREIGN PATENT DOCUMENTS

| | | |
|---|---|---|
| WO | 2013049248 A2 | 4/2013 |
| WO | 2013063056 A1 | 5/2013 |

(Continued)

OTHER PUBLICATIONS

International Search Report and Written Opinion from International Application No. PCT/US2014/069160, dated Mar. 17, 2015, 13 pp.

(Continued)

*Primary Examiner* — Timothy J Henn
(74) *Attorney, Agent, or Firm* — Shumaker & Sieffert, P.A.

(57) ABSTRACT

In an example, a method includes determining, by an electronic device, a user experience metric associated with content captured by at least one camera of the electronic device. The method also includes adjusting at least one operating parameter of the device to produce an operating characteristic target, wherein the adjustment is based on an estimated change to the determined user experience metric due to the adjustment.

32 Claims, 8 Drawing Sheets

(56) References Cited

U.S. PATENT DOCUMENTS

2015/0160709 A1* 6/2015 Park .................. G06F 1/3206
                                                        713/320
2015/0185814 A1* 7/2015 Ping .................. G06F 1/206
                                                        713/323

FOREIGN PATENT DOCUMENTS

| WO | 2014197565 | | 12/2014 |
| WO | 2015089132 | A1 | 6/2015 |

OTHER PUBLICATIONS

Ogras, et al., "Managing mobile platform power", Computer-Aided Design, IEEE Press, 445 Hoes Lane Po Box 1331 Piscataway, NJ 08855-1331 USA, Nov. 18, 2013, XP032535841, pp. 161-162.

Response to First Written Opinion dated Mar. 17, 2015 from corresponding PCT Application Serial No. PCT/US2014/069160 filed on Oct. 20, 2015 (24 pages).

Second Written Opinion dated Nov. 27, 2015 from corresponding PCT Application Serial No. PCT/US2014/069160 (8 pages).

Response to Second Written Opinion dated Nov. 27, 2015 from corresponding PCT Application Serial No. PCT/US2014/069160 filed on Jan. 25, 2016 (21 pages).

International Preliminary Report on Patentability dated Mar. 30, 2016 from corresponding PCT Application Serial No. PCT/US2014/069160 (23 pages).

* cited by examiner

THERMAL AND POWER MANAGEMENT

This application claims the benefit of U.S. Provisional Application No. 61/919,543 filed Dec. 20, 2013.

TECHNICAL FIELD

This disclosure relates to techniques for rendering video data with a computing device.

BACKGROUND

Mobile devices may take the form of mobile telephones, tablet computers, laptop computers, portable computers with wireless communication cards, personal digital assistants (PDAs), digital cameras, video gaming devices, portable media players, flash memory devices with wireless communication capabilities, wireless communication devices including so-called "smart" phones and "smart" pads or tablets, e-readers, or other of a wide variety of other types of portable devices. Mobile devices are becoming increasingly powerful with the addition of high-power processors, the capability to process media content, and the ability to interact with networks in the cloud. The advancements in processing power and capabilities of devices may also cause the devices to consume power and/or generate heat.

SUMMARY

The techniques of this disclosure include adjusting one or more operating parameters of an electronic device in response to an estimation of a user experience. For example, an electronic device may consume energy and produce heat during operation. According to aspects of this disclosure, a device may determine a user experience metric that provides an estimation of a user experience. The device may tactically adjust one or more operating parameters based on the user experience metric to maintain the device operating below a target power usage limit or temperature limit, but that minimizes the impact to the user experience.

In an example, a method includes determining, by an electronic device, a user experience metric associated with content captured by at least one camera of the electronic device, and adjusting at least one operating parameter of the device to produce an operating characteristic target, wherein the adjustment is based on an estimated change to the determined user experience metric due to the adjustment.

In another example, an electronic device includes at least one camera, and one or more processors configured to determine a user experience metric associated with content captured by the at least one camera of the electronic device, and to adjust at least one operating parameter of the device to produce an operating characteristic target, wherein the adjustment is based on an estimated change to the determined user experience metric due to the adjustment.

In another example, an apparatus includes means for determining a user experience metric associated with content captured by at least one camera of an electronic device, and means for adjusting at least one operating parameter of the device to produce an operating characteristic target, wherein the adjustment is based on an estimated change to the determined user experience metric due to the adjustment.

In another example, a non-transitory computer-readable medium has instructions stored thereon that, when executed, cause one or more processors to determine a user experience metric associated with content captured by at least one camera of an electronic device, and adjust at least one operating parameter of the device to produce an operating characteristic target, wherein the adjustment is based on an estimated change to the determined user experience metric due to the adjustment.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

The techniques of this disclosure include adjusting one or more operating parameters of an electronic device in response to an estimation of a user experience. For example, an electronic device may consume energy and produce heat during operation. According to aspects of this disclosure, a device may determine a user experience metric that provides an estimation of a user experience. The device may tactically adjust one or more operating parameters based on the user experience metric to maintain the device operating below a target power usage limit or temperature limit, while minimizing the impact to the user experience.

Figure 1:
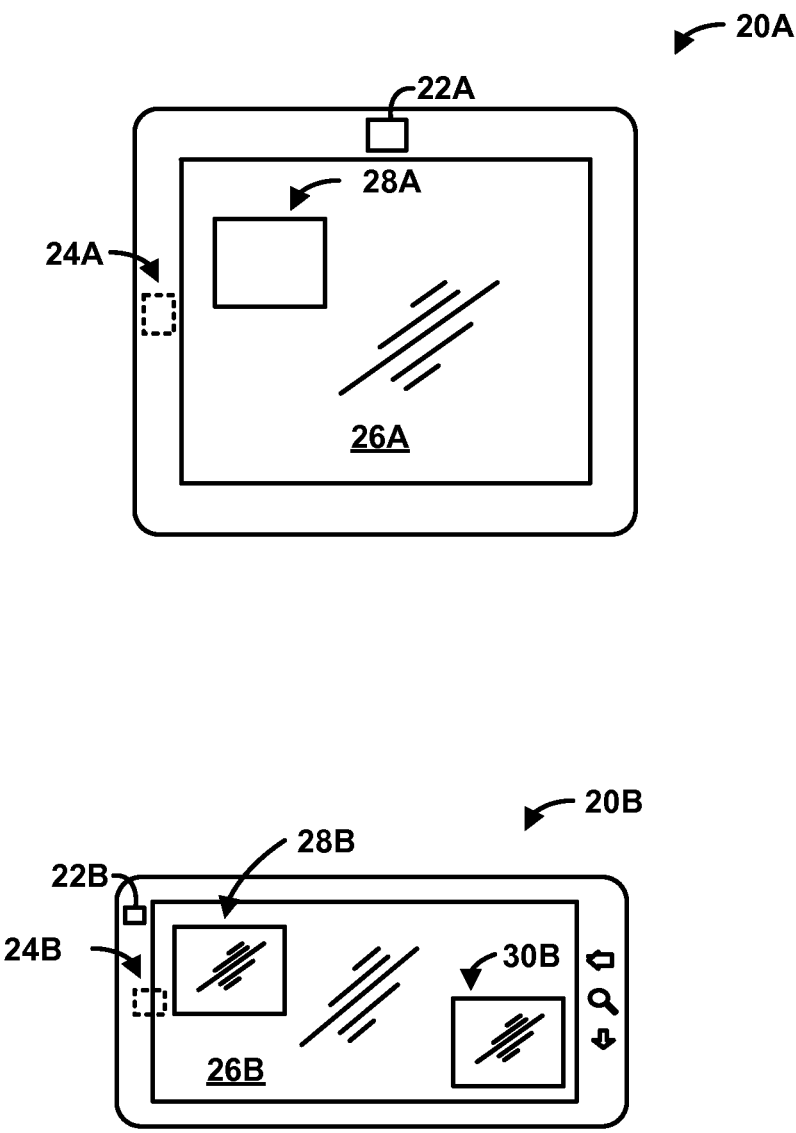
FIG. 1 illustrates example devices that may implement techniques of this disclosure.

FIG. 1 illustrates example devices that may implement techniques of this disclosure. In general, the techniques of this disclosure may be implemented with devices having at least one image sensor and image processor (which may be configured for high resolution pictures and/or video) and a power and/or thermal limit. For example, device 20A includes a front image sensor 22A, a rear image sensor 24A, a display 26A and a picture-in-picture (PIP) window 28A. In addition, device 20B includes a front image sensor 22B, a rear image sensor 24B, a display 26B, a first PIP window 28B and a second PIP window 30B.

Devices 20A and 20B may comprise any of a wide range of devices including, for example, telephone handsets such as so-called "smart" phones, tablet computers, cameras, notebook (i.e., laptop) computers, digital media players, video gaming consoles, video streaming devices, or the like. While devices 20A and 20B may be portable devices, the techniques of this disclosure are not limited in this way. For example, according to other aspects, the techniques may be used with desktop computers, set-top boxes, televisions, or other devices.

Front image sensors 22A and 22B and rear image sensors 24A and 24B may be configured to capture images. For example, front image sensors 22A and 22B and rear image sensors 24A and 24B may include any components for converting an optical image into an electronic signal. Example image sensors include charge-coupled devices (CCD), complementary metal-oxide-semiconductor (CMOS), N-type metal-oxide-semiconductor (NMOS), or the like. In some instances, as described in greater detail below, front image sensors 22A and 22B and rear image sensors 24A and 24B may be included in one or more camera systems or sub-systems.

Displays 26A and 26B may include a liquid crystal display (LCD), a light emitting diode (LED), an organic light emitting diode (OLED), or any other type of device that can generate output to a user. In some instances, displays 26A and 26B may be configured as touch-sensitive and/or presence-sensitive displays.

In the example shown in FIG. 1, device 20A includes PIP window 28A and device 20B includes PIP windows 28B and 30B. In some examples, the PIP windows may provide areas for displaying content independently from other content being displayed at displays 26A and 26B. For example, devices 20A and/or 20B may be configured to perform picture-in-picture video recording. In this example, device 20A may record images being displayed at display 26A, while PIP window 28A may display an image of a user capturing the recorded images. In another example, devices 20A and/or 20B may perform video conferencing in conjunction with gaming. For example, device 20B may output a video game to display 26B while also displaying images of a user playing the video game in PIP window 28B and an opponent or companion of the user (also playing the video game) in PIP window 30B. Other examples are also possible.

In some instances, devices 20A and 20B may approach or exceed operating parameters. As an example, as devices 20A and 20B perform an increasing number of functions (e.g., capturing video, rendering graphics, encoding/decoding video, displaying video, or the like), the power consumed by devices 20A and 20B may rise. In addition, in some instances, one or more components of devices 20A and 20B (e.g., a central processing unit (CPU), graphics processing unit (GPU), a camera sub-system, displays 26A and 26B, or the like, as described in greater detail, for example, with respect to FIG. 2) may generate heat as a byproduct. Some example functions include wide quad high definition (WQHD) picture-in-picture (PIP) video recording, ultra high definition (UHD) video recording, gaming and video conferencing, high-resolution three-dimensional (3D) graphics rendering with video conferencing, or the like.

Devices 20A and 20B may approach or exceed operating parameters such as a power budget (e.g., 2 watts) or a temperature limit. In some instances, a camera sub-system including, for example, any combination of one or more image processors, front image sensors 22A and 22B and rear image sensors 24A and 24B, and other components associated with capturing images, may contribute to the consumption of power and/or the generation of heat. For example, enhancements in quality, performance, and/or concurrency may result in a higher power and/or temperature cost.

The techniques of this disclosure include adjusting one or more operating parameters of an electronic device, such as device 20A or device 20B, in response to an estimation of a user experience. For example, according to aspects of this disclosure, devices 20A or 20B may determine a user experience metric that provides an estimation of a user experience. Devices 20A or 20B may adjust one or more operating parameters based on the user experience metric to maintain the device operating below a target power usage limit or temperature limit. For example, according to aspects of this disclosure, devices 20A or 20B may utilize the user experience metric to adjust one or more operating parameters in a way that minimizes the impact to the user experience yet satisfies the target power usage limit or temperature limit.

Figure 2:
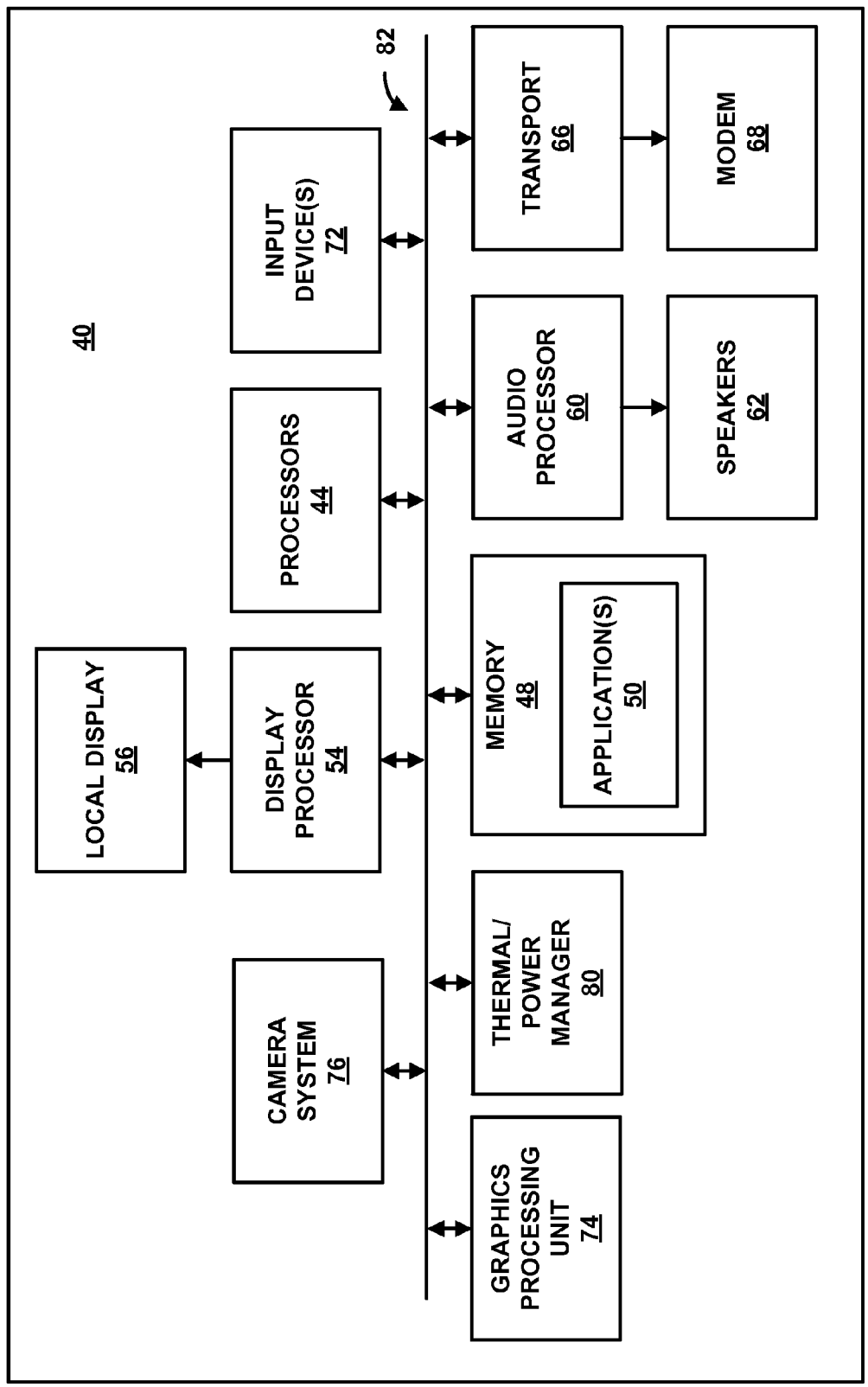
FIG. 2 is a block diagram showing an example of a device that may be configured to implement the techniques of this disclosure

FIG. 2 is a block diagram showing one example of a device 40 that may be configured to implement the techniques of this disclosure. In some examples, one or more components shown and described with respect to device 40 may be incorporated in device 20A and/or device 20B (FIG. 1).

In the example shown in FIG. 2, device 40 includes one or more processors 44, memory 48 having a frame buffer 233 and storing one or more applications 50, display processor 54, local display 56, audio processor 60, speakers 62, transport module 66, wireless modem 68, input devices 72, camera system(s) 76, and thermal/power manager 80. Other examples may include more or fewer components than those shown in FIG. 2. In addition, while certain components are described separately for purposes of discussion, it should be understood that some components shown and described with respect to FIG. 2 may be highly integrated or combined to form a single component.

Each of components 44, 48, 54, 60, 66, 72, 76 and 80 may be interconnected (physically, communicatively, and/or operatively) for inter-component communications via communication channels 82. In some examples, communication channels 82 may include a system bus, network connection, inter process communication data structure, or any other channel for communicating data.

One or more processors 44 may be capable of processing instructions stored in storage device memory 48. One or more of processors 44 may form a central processing unit (CPU) for device 40. Processors 44 may include, for example, one or more microprocessors, DSPs, ASICs, FPGAs, discrete logic, or any combinations thereof. In some examples, processors 104 may include fixed function logic and/or programmable logic, and may execute software and/or firmware. When the techniques are implemented partially in software, a device may store instructions for the software in a suitable, non-transitory computer-readable medium and execute the instructions in hardware using one or more processors to perform the techniques of this disclosure.

In some examples, processors 44 may be configured to encode and/or decode A/V data for transport, storage, and display. For example, one or more of processors 44 may operate as a video encoder or a video decoder, either of which may be integrated as part of a combined video encoder/decoder (codec). In some instances, the codec may operate according to a video compression standard, such as the ITU-T H.264 standard, alternatively referred to as MPEG-4, Part 10, Advanced Video Coding (AVC), or extensions of such standards. Other examples of video compression standards include MPEG-2 and ITU-T H.263 and the High Efficiency Video Coding (HEVC) standard.

With respect to HEVC, a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video picture may be partitioned into one or more slices. Each treeblock may be split into coding units (CUs) according to a quadtree.

A CU has a similar purpose as a macroblock of the H.264 standard, except that a CU does not have a size distinction. A CU includes a coding node and prediction units (PUs) and transform units (TUs) associated with the coding node. In general, a PU represents a spatial area corresponding to all or a portion of the corresponding CU, and may include data for retrieving a reference sample for the PU.

For example, spatial or temporal prediction results in a predictive block for a block to be coded. Residual data represents pixel differences between the original block to be coded and the predictive block. An inter-coded block is coded according to a motion vector that points to a block of reference samples forming the predictive block, and the residual data indicating the difference between the coded block and the predictive block. An intra-coded block is encoded according to an intra-coding mode that indicates the manner in which the block is predicted from spatially neighboring samples and the residual data.

In HEVC, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following transformation, the codec may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

The codec may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. After scanning the quantized transform coefficients to form a one-dimensional vector, the codec may entropy encode the one-dimensional vector. In instances in which the codec is decoding video data, the codec may perform video decoding according to a process generally reciprocal to the process described above.

Although not shown in FIG. 2, in some aspects, the codec may be provided along with an audio encoder and decoder. Appropriate MUX-DEMUX units, or other hardware and software, may also be provided to handle encoding of both audio and video in a common data stream or separate data streams. If applicable, MUX-DEMUX units may conform to the ITU H.223 multiplexer protocol, or other protocols such as the user datagram protocol (UDP).

Memory 48 of FIG. 2 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), magnetic random access memory (MRAM), FLASH memory, and the like, Memory 48 may comprise a computer-readable storage medium for storing audio/video data, as well as other kinds of data.

In some examples, memory 48 may store applications 50 that are executed by processor 44 as part of performing the various techniques described in this disclosure. Memory 48 may also store certain A/V data for presentation by device 40. For example, memory 48 may store an entire A/V file, or may comprise a smaller buffer that simply stores a portion of an A/V file, e.g., streamed from another device or source. In any event, memory 48 may buffer A/V data before the data is presented by device 40.

In some examples, device 40 may locally process and display A/V data. In particular, display processor 54 may form a portion of a platform for processing video data to be displayed on local display 56. In this regard, display processor 54 may include a codec (as described above with respect to processors 44). Display 56 may include a liquid crystal display (LCD), light emitting diode (LED), organic light emitting diode (OLED), or any other type of device that can generate intelligible output to a user. In addition, audio processor 60 may process audio data for output on one or more speakers 62.

Transport module 66 may process encoded AiV data for a network transport. For example, encoded A/V data may be processed by processors 44 and encapsulated by transport module 66 into Network Access Layer (NAL) units for communication across a network. The NAL units may be sent by modem 68 to another device via a network connection. In this regard, modem 68 may operate according to any number of communication techniques including, e.g., orthogonal frequency division multiplexing (OFDM) techniques, time division multi access (TDMA), frequency division multi access (FDMA), code division multi access (CDMA), or any combination of OFDM, FDMA, TDMA and/or CDMA, WiFi, Bluetooth, Ethernet, the IEEE 802.11 family of standards, or any other wireless or wired communication technique. In some instances, modem 68 of device 40 may receive encapsulated data packets, such as NAL units, and sends the encapsulated data units to transport unit 66 for decapsulation. For instance, transport unit 66 may extract data packets from the NAL units, and processors 44 can parse the data packets to extract the user input commands.

One or more input devices 72 may be configured to receive input from a user through tactile, audio, or video feedback. Examples of input device 42 include a touch and/or presence sensitive screen, a mouse, a keyboard, a voice responsive system, a microphone or any other type of device for detecting a command from a user.

Graphics processing unit (GPU) 74 represents one or more dedicated processors for performing graphical operations. That is, for example, GPU 74 may be a dedicated hardware unit having fixed function and programmable components for rendering graphics and executing GPU applications. GPU 74 may also include a DSP, a general purpose microprocessor, an ASIC, an FPGA, or other equivalent integrated or discrete logic circuitry. Although GPU 74 is illustrated as a separate unit in the example of FIG. 2, in some examples, GPU 74 may be integrated with one or more other processors 44 (such as a CPU) into a single unit.

Camera system 76 may include one or more image processors, one or more image sensors (e.g., CCD sensors, CMOS sensors, NMOS sensors, or the like), as well as a number of other components for capturing images. Camera system 76 may include one or more components for so-called camera phones or video phones. In some examples, camera system 76 may support multiple image sensors (e.g., a front image sensor and a rear image sensor of a camera phone or video phone). The image streams generated by such image sensors of camera system 76 may be processed by one or more image processors. In some instances, camera system 76 may operate in combination with GPU 74 to generate computer graphics-based data as the source video, or a combination of live video, archived video, and/or computer-generated video. The captured, pre-captured, or computer-generated video may be encoded by a video encoder (described above).

Thermal/power manager 80 may manage one or more components of device 40 to keep the one or more components operating at or below one or more operating characteristic targets. In an example, the operating characteristic target may be a thermal target (which also may be referred to as a thermal limit or thermal threshold) indicative of an operating temperature of device 40, such that adjusting the at least one operating parameter of the device to produce the operating characteristic target comprises adjusting the at least one operating parameter of the device to maintain a temperature of one or more components of device 40 equal to or less than the thermal target. In another example, the operating characteristic target comprises a power target (which also may be referred to as a power budget or power threshold) indicative of an amount of power consumed by operating the device, such that adjusting the at least one operating parameter of device 40 to produce the operating characteristic target comprises adjusting the at least one operating parameter of device 40 to maintain a power consumption of one or more components of device 40 equal to or less than the power target.

As described in greater detail below, thermal/power manager 80 may adjust one or more operating parameters of device 40 based on a user experience metric. For example, according to aspects of this disclosure, device 40 may utilize the user experience metric to adjust one or more operating parameters in a way that minimizes the impact to a user experience, yet satisfies the operating characteristic target.

Figure 3:
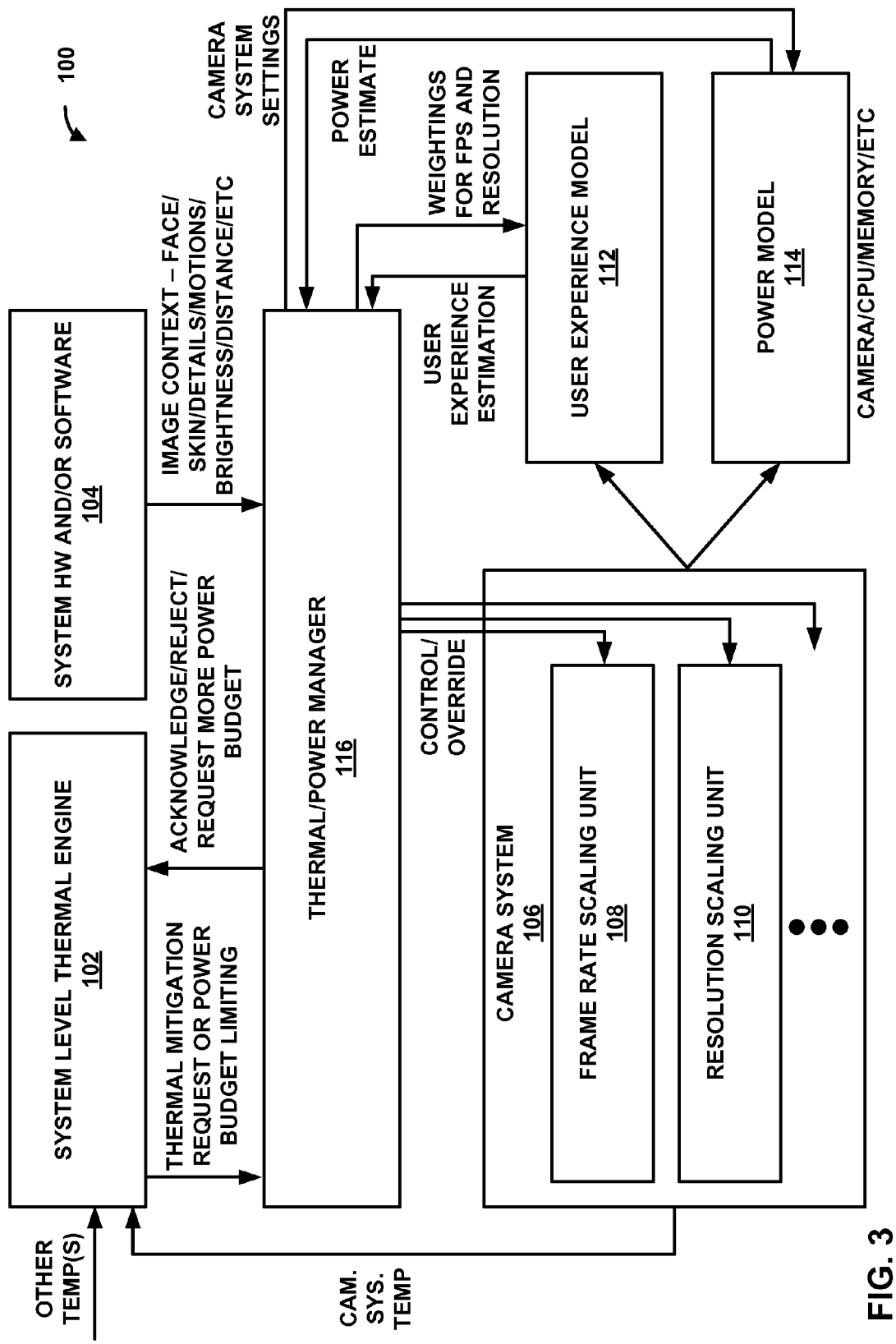
FIG. 3 illustrates an example of a management system of a device that may implement techniques of this disclosure.

FIG. 3 illustrates an example a management system 100 of a device that may implement techniques of this disclosure. In the example of FIG. 3, the management system includes a system level thermal engine 102, system hardware or a combination of hardware and/or software 104, a camera system 106 having a frame rate scaling unit 108 and a resolution scaling unit 110, a user experience model 112, a power model 114, and a thermal/power manager 116. As noted below, in some instances, user experience model 112 and/or power model 114 may be data stored to a memory defining models for use by thermal/power manager 116 or another processor of management system 100. In other examples, management system 100 may include more or fewer components than those shown in FIG. 3. In some examples, management system 100 may be incorporated in device 20A, device 20B, device 40, or any number of other electronic devices.

System level thermal engine 102 may be responsible for maintaining a temperature of the device (or one or more components the device) below a temperature threshold. In some examples, system level thermal engine 102 may issue a thermal mitigation request (e.g., a request to reduce the temperature of one or more components of the device) and/or a power budget limitation (e.g., a predetermined power consumption limitation) to thermal/power manager 116 (thermal mitigation request or power budget limiting). System level thermal engine 102 may also receive an acknowledgement, a rejection, and/or a request for an increase to the power budget from thermal/power manager 116.

System hardware (system HW) or a combination of hardware and software 104 represent hardware or a combination of hardware and software components of the device. Examples of hardware and/or software 104 include hardware and/or software for capturing or processing images (e.g., an Auto-White Balancing (AWB) feature, an Auto Focus (AF) feature, a face detection feature, an Image Sensor Processor (ISP), face detection software, a codec, one or more filters for image processing (such as a high pass filter), or the like. Hardware and/or software 104 may, in some instances, provide information to thermal/power manager 116 such as image context. Image context may include, as examples, data indicating the presence of a face or skin, data indicating a level of detail in captured images or video, data indicating motion in captured images or video, data indicating brightness of captured images or video, a distance of a camera to content being captured, or the like.

In some examples, camera system 106 may be configured similarly to camera system 76 of device 40 (FIG. 2). For example, camera system 106 may include one or more image processors, one or more image sensors (e.g., CCD sensors, CMOS sensors, NMOS sensors, or the like), as well as a number of other hardware or a combination of hardware and software components for capturing images. In some examples, camera system 106 may support multiple image sensors (e.g., a front image sensor and a rear image sensor of a camera phone or video phone). Such image sensors of camera system 106, in some instances, may be physically separate from other components of the device implementing management system 100 (e.g., separate from a system on chip (SOC) of the device). The image streams generated by such image sensors of camera system 106 may be processed by one or more image processors of camera system 106.

In the example of FIG. 3, camera system 106 also includes frame rate scaling unit 108 and resolution scaling unit 110. Frame rate scaling unit 108 may be operable to change the frame rate of video being captured by camera system 106. Resolution scaling unit 110 may be operable to change the resolution of images captured by camera system 106. In some examples, as described in greater detail below, frame scaling unit 108 and resolution scaling unit 110 may receive commands from thermal/power manager 116. For example, frame scaling unit 108 may receive control commands from thermal/power manager 116 that indicate a particular frame rate. In addition, resolution scaling unit 110 may receive control commands from thermal/power manager 116 that indicate a particular resolution. In some instances, these control signals may be used to override preexisting frame rate and/or resolution settings, e.g., set by another processor or control unit.

User experience model 112 may represent one example of a model that provides an estimation of a perceived user experience. For example, user experience model 112 may provide an empirical indication of the user experience when a user views images or video captured by camera system 76. In some instances, user experience model 112 may generate a numerical indication of a relative user experience. In an example for purposes of illustration, user experience model 112 may return a numerical score in a predetermined range of values, where the lowest score in the range represents the least acceptable user experience and the highest score in the range represents the best user experience. In some instances, the highest score may be subject to the capabilities or limitations of the device and/or camera system 76 (e.g., some devices may be capable of achieving a higher score than others).

In this way, user experience model 112 may provide an estimation of the quality (or perceived quality) of images or video being captured by camera system 106 and/or presented at a display of the device (such as local display 56 of device 40 (FIG. 2)). For example, as described in greater detail below, images or video captured with a relatively higher resolution may result in a relatively higher result from user experience model 112. Likewise, as another example, video captured at a relatively higher frame rate (e.g., 60 frames per second (fps), 30 fps, 15 fps, or the like) may result in a relatively higher score from user experience model.

In some examples, as described in greater detail below, user experience model 112 may be configured to determine a change in user experience resulting from changes to one or more operating parameters of the device, such as one or more operating parameters of camera system 106. For example, user experience model 112 may be configured to determine an anticipated increase or degradation to the user experience resulting from a change to one or more operating parameters of the device. This change in user experience may be referred to as a user experience model 112 delta, as described in greater detail below.

As an example for purposes of illustration, user experience model 112 may be configured to determine a change in the user experience (e.g., a change in quality as perceived by a user of the device) produced by changing a frame rate of video captured by camera system 106. For example, increasing the frame rate of camera system 106 may produce an increase in the result of user experience model 112. In another example, user experience model 112 may be configured to determine a change in the user experience (e.g., a change in quality as perceived by a user of the device) produced by changing a resolution of video captured by camera system 106. In this example, increasing the resolution of camera system 106 may produce an increase in the result of user experience model 112.

In some examples, operating parameters associated with components of the device may be referred to as "knobs." For example, a number of control "knobs" may be associated with providing a particular user experience. In addition to the frame rate scaling and resolution scaling knobs described above, other knobs may include software functionality associated with camera system 106 and/or hardware components of the device (as described in greater detail, for example, with respect to Table 1 below).

In some examples, thermal/power manager 116 may determine user experience model 112 based on a vector of operation conditions and/or parameters. For example, an operating parameter vector S may include a number of operating parameters including a frame rate of camera system 106, a resolution of camera system 106, and/or a number of other knobs, such that the user experience model may be determined according to the following equations:

$S=[FPS, resolution, knob1, knob2, \ldots knobN]$ $Ux=UxModel(S)$ where S is a vector of operating parameters, Ux represents a user experience result, and UxModel represents a user experience model that is applied to the vector of operating parameters S.

In instances in which camera system 106 includes more than one image sensor generating more than one image stream, thermal/power manager 116 may determine user experience model 112 based on a vector of operating conditions and/or parameters for each of the image sensors. For example, each image stream of camera system 106 may have its own set of associated knobs, and each stream may be separately controlled using the knobs. User experience model 112 may determine a single user experience estimate based on all of the operating parameters associated with all of the image streams.

In an example for purposes of illustration, assume that two image sensors IS1 and IS2 of camera system 106 generate respective image streams that are processed by camera system 106. In this example, each image stream (e.g., a first stream associated with IS1 and a second image stream associated with IS2) are separately controlled with separate knobs, as shown in the example vector S below:

$S=[FPS$ for $IS1$, resolution for $IS1$, knob1 for $IS1$, knob2 for $IS1$, ... knob$N$ for $IS1$, FPS for $IS2$, resolution for $IS2$, knob1 for $IS2$, knob2 for $IS2$, ... knob$N$ for $IS2]$ In addition, a single user experience model 112 may be determined based on the parameters of vector S. In this example, user experience Ux may be determined in the same manner as described with respect to the equation above:

$Ux=UxModel(S)$ where S is the vector of operating parameters that includes operating parameters for both image sensors IS1 and IS2, Ux represents a user experience result, and UxModel represents a user experience model that is applied to the vector of operating parameters S.

Power model 114 may provide an indication of an amount of power consumed by the device. For example, power model 114 may provide a numerical indication of an amount of power that is used by one or more components of the device (e.g., such as a CPU, GPU, camera system 106, or the like). In some examples, as described in greater detail below, power model 114 may be configured to determine a change in an amount of power that will be consumed by the device resulting from changes to one or more operating parapmeters of the device, such as one or more operating parameters of camera system 106.

As an example for purposes of illustration, power model 114 may be configured to determine an amount of power savings (or an increase in power), e.g., a decrease or increase in the amount of power consumed by camera system 106 and/or device, produced by changing a frame rate of video captured by camera system 106. For example, reducing the frame rate of camera system 106 may result in a decline in the amount of power consumed by camera system 106 and/or other components of the device (e.g., a CPU, GPU, memory, or the like). In another example, power model 114 may be configured to determine an amount of power savings (or an increase in power) produced by changing a resolution of video captured by camera system 106. In this example, decreasing the resolution of camera system 106 may result in a decline in the amount of power consumed by camera system 106 and/or other components of the device (e.g., a CPU, GPU, memory, or the like).

While certain examples described herein are described with respect to changes to camera system 106, it should be understood that changing one or more operating parameters of a particular component of the device, such as camera system 106, may result in a cascading change that affects a number of components of the device (e.g., a CPU, GPU, memory, or the like). Accordingly, as merely one example, reducing a frame rate associated with camera system 106 may not only result in a decrease in an amount of power consumed by camera system 106, but also a decrease in the amount of power consumed by other components of the device such as a CPU and/or memory.

Power model 114 may also provide an indication of the heat generated by the device. For example, typically, as a device consumes more power, the amount of thermal energy or heat created by the device rises. For example, as one or more components of the device (such as a CPU, GPU, camera system 106, or the like) draw more power, the amount of heat that is generated by the one or more components as a byproduct also increases. Accordingly, power model 114 may be configured to provide an estimation of an amount of heat that will be generated by components of the device upon changing an operating characteristic of the components.

Thermal/power manager 116 may use the information described above to adjust one or more operating parameters of the device, including camera system 106. For example, as described in greater detail below, thermal/power manager 116 may adjust a frame rate of video captured by camera system 106 by issuing a command to frame rate scaling unit 108, a resolution of video captured by camera system 106 by issuing a command to resolution scaling unit 110, or a number of other operating parameters by issuing a command to other units of camera system 106 (represented by ellipse in the example of FIG. 3).

Thermal/power manager 116 may adjust one or more control "knobs" to maintain a particular power budget and/or thermal threshold. In addition to the frame rate scaling and resolution scaling knobs described above, Table 1 (below) includes a number of other knobs (or operating parameters) that may be adjusted by thermal/power manager 116. In instances in which camera system 106 includes more than one image sensor and/or image processor, each image sensor and/or image processor may have different parameter settings for the set of knobs.

TABLE 1

| Target Function | "Knob" | Enablement | Notes |
|---|---|---|---|
| SW (Apps) | 3A control | Reduce amount 3A stats processing | Reducing granularity of stats will reduce processor loading contributing to lower power |
| | 3A control | Reduce processing FPS | For SW control & stats, drop frames for stats processing, thereby reducing processor power |
| | Add-on features | Turn-off features during thermal mitigation trigger | Additional user selectable features such as face detection, or flicker reduction, etc. and any other post-processing feature for image quality enhancements can be selectively turned-off for processor power reduction. |
| HW | ISP Block Processor FPS reduction | Reduce ISP offline block processor clock | Continue the streaming front-end of the ISP & sensor control @ native sensor rate, get savings from memory traffic & core power |
| | ISP Streaming Processor rate control | Output rate control via frame drops | Stats & 3A required to run at sensor rate |
| | ISP Streaming Processor output control | Drop frames at output | Reduce power on bus, match downstream FPS during mitigation |
| | ISP Module Control | Turn-off hot modules | Identified "hot-modules" can be selectively turned off to save core power at the expense of reduced functionality or quality. |

TABLE 1-continued

| Target Function | "Knob" | Enablement | Notes |
|---|---|---|---|
| | Clock Control | Run cores adequately fast | ISP Streaming Processor can run slower even in turbo modes for e.g. |
| | Dual ISP (ISP Streaming Processor) operation | Use lower clocks with dual-ISP | When we have a single sensor processed, selectively use the best topology to achieve lower core power. |
| Sensor | Sensor rate control | Via automatic frame rate control or mode change | Described in this disclosure. |

According to aspects of this disclosure, thermal/power manager 116 may receive a thermal mitigation request (e.g., a request to reduce the temperature of the device and/or one or more components of the device) from system level thermal engine 102. Thermal/power manager 116 may additionally or alternatively receive a power budget limit (e.g., a power usage threshold) indicating a power usage limit for components of the device from system level thermal engine 102.

Thermal/power manager 116 may change one or more operating parameters of components of the device (such as camera system 106) to meet the received thermal target or power budget. For example, thermal/power manager 116 may adjust one or more operating parameters (such as a frame rate or resolution of video captured by camera system 106 or a variety of other "knobs") of one or more components of the device to meet the received thermal target or power budget.

In some examples, the operation of thermal/power manager 116 may be influenced by user experience model 112 and/or power model 114. For example, as described in greater detail below, thermal/power manager 116 may determine a user experience metric associated with content captured by a camera of a device. In some examples, the user experience metric may include one or more results from user experience model 112. In addition, thermal/power manager 116 may adjust, based on an estimated change to the determined user experience metric, at least one operating parameter of the device to produce an operating characteristic target (e.g., a thermal target or power budget).

According to aspects of this disclosure, thermal/power manager 116 may adjust the operating parameters by selecting one or more operating parameters to minimize or at least decrease the user experience (as determined using user experience model 112) relative to selecting other operating parameters. Additionally or alternatively, thermal/power manager 116 may adjust the operating parameters by selecting one or more operating parameters to maximize or at least increase a change in the operating parameters, thereby increasing or potentially maximizing a change in power usage (as determined using power model 114) relative to selecting other operating parameters.

In some examples, thermal/power manager 116 may determine an optimal operating parameter adjustment that results in the smallest change in user experience (e.g., decrease in user experience) and the largest change in power consumption (e.g., decrease in operating power). In some examples, as described in greater detail with respect to FIG. 7, the optimal operating parameter adjustment (identifying the one or more operating parameters for change and an amount for adjustment) may be determined based on a ratio of an estimated change in the determined user experience to the estimated change in the operating characteristic.

That is, in an example for purposes of illustration, thermal/power manager 116 may determine a ratio of a delta in the user experience model 112 to a delta in the power model 114. In this example, thermal/power manager 116 may determine the operating parameter(s) and adjustment quantities that produce the relatively smallest ratio.

In some examples, thermal/power manager 116 may be influenced by context associated with the content being captured by camera system 106. For example, thermal/power manager 116 may receive contextual information regarding the content being captured by camera system 106 from system hardware or a combination of hardware and software 104. Example context may include whether there is a face included in the content, the hue and/or color of the content (e.g., whether there are at least some skin tones included in the content), whether the content includes a relatively high amount of detail, whether the content is moving (e.g., an amount of motion associated with the content), the brightness of the content, a distance between an image sensor of camera system 106 and the content, or a variety of other context.

Thermal/power manager 116 may select an operating parameter to adjust (e.g., a frame rate, a resolution, or the like) as well as an amount to adjust the selected operating parameter based on the context. As an example merely for purposes of illustration, assume that thermal/power manager 116 receives a request to reduce power consumption and/or temperature associated with the device. Assume further that thermal/power manager 116 adjusts a frame rate and a resolution of camera system 106 in order to meet the request. In this example, if a face is detected in the content, thermal/power manager 116 may adjust a frame rate of camera system 106 relatively more than a resolution of camera system 106 under the assumption that capturing the details of the face (such as an expression) are relatively more important to the user experience than capturing smooth motion (associated with the frame rate). Other examples are possible using any combination of the context noted above.

In some examples, according to aspects of this disclosure, thermal/power manager 116 may apply a weighting factor to one or more operating parameters in the user experience model based on context (e.g., weightings for FPS and resolution). For example, thermal/power manager 116 may determine user experience model 112 based on the equations below:

$S=[FPS, resolution, knob1, knob2, \ldots knobN]$ $Ux=UxModel(S)$ $Ux=WeightedSum(UxModel\_1(FPS), UxModel\_2$
$(resolution),$ $UxModel\_3(knob1)\ldots)$ where S is a vector of operating parameters, Ux represents a user experience result, and UxModel represents a user experience model that is applied to the vector of operating parameters S. In addition, Ux is a function of a weighted sum of operating parameters, each of which includes a weighting factor associated with their respective user experience models (UxModel_1, UxModel_2, UxModel_3, and so on).

As noted above, in some examples, camera system 106 may include more than one image sensor and associated image stream, with separate knobs for each steam. In some instances, vector S may include knobs for all of the image streams (e.g., S=[FPS for IS1, resolution for IS1, knob1 for IS1, knob2 for IS1, . . . knobN for IS1, FPS for IS2, resolution for IS2, knob1 for IS2, knob2 for IS2, . . . knobN for IS2]). In addition, Ux may be a function of a weighted sum of operating parameters, each of which includes a weighting factor associate with their respective user experience models (e.g., Ux=WeightedSum(UxModel_1(FPS for IS1), UxModel_2 (resolution for IS1), UxModel_3(knob1 for IS1) . . . , UxModel_1(FPS for IS2), UxModel_2 (resolution for IS2), UxModel_3(knob1 for IS2) . . . ))

Table 2, shown below, illustrates potential weighting factors for a frame rate operating parameter and a resolution operating parameter for a variety of contexts:

TABLE 2

| Exemplary image context (HW block providing the information) | Weighting factor for FPS | Weighting factor for resolution |
| --- | --- | --- |
| User's face detected (from face detection block) | Low | High |
| Significant portion of image is skin | Low | High |
| Lots of details (from HPF block) | Low | High |
| Lots of motion (from video encoder) | High | Low |
| Low brightness | High | Low |
| Close distance - Arm's length (from auto-focus) | Low | High |

In the examples above, the weighting factors may be selected to provide the relatively smallest degradation in user experience while also maximizing a change in the operating parameter (and associated power draw). Returning to the example above in which the context includes detection of a face, thermal/power manager 116 may adjust a frame rate of camera system 106 relatively more than a resolution of camera system 106 under the assumption that capturing the details of the face (such as an expression) are relatively more important to the user experience than capturing smooth motion (associated with the frame rate). In this example, as shown in the example of Table 1 above, thermal/power manager 116 may place a relatively high weight on resolution and a relatively low weight on the frame rate. Other examples are possible using any combination of the context noted above.

Accordingly, in operation, system level thermal engine 102 may issue a thermal mitigation request and/or a power budget limit to thermal/power manager 116. Thermal/power manager 116 may acknowledge the message, reject the request, or request an additional power budget (acknowledge/reject/request more power budget). In addition, thermal/power manager 116 may issue controls and/or override commands to camera system 106, including commands for controlling operating parameters such as frame rate (command issued to frame rate scaling unit 108), resolution (command issued to resolution scaling unit 110), or other control parameters (represented by ellipse).

Camera system may provide temperature feedback to system level thermal engine 102 (cam. sys. temp.) as well as an indication of operating parameters to user experience model 112 and power model 114.

User experience model 112 may be used to determine a user experience metric representing an estimation of a user experience based on the operating parameters from camera system 106. While shown as a separate unit in the example of FIG. 3 for purposes of explanation, in some instances, user experience model 112 may be data (including, e.g., one or more user experience algorithms) used by thermal/power manager 116 to provide an estimation of a user experience. In other examples, user experience model 112 may include separate processing hardware, such as programmable or fixed function hardware. In some examples, the user experience metric may be a numerical value. In addition, user experience model 112 may provide the estimation of the user experience to thermal/power manager 116 and may receive weighting factors associated with the operating parameters.

Power model 114 may determine an amount of power consumed by the device based on the operating parameters from camera system 106. Again, while shown as a separate unit in the example of FIG. 3 for purposes of explanation, in some instances, power model 114 may be data (including, e.g., one or more algorithms for determining power consumption) used by thermal/power manager 116 to provide an indication of an amount of power consumed by the device. In other examples, power model 114 may include separate processing hardware, such as programmable or fixed function hardware. Power model 114 may provide a numerical indication of an amount of power that is used by one or more components of the device (e.g., such as a CPU, GPU, camera system 106, or the like) based on the operation of camera system 106. Power model 114 may also (or alternatively) provide an indication of the heat generated by the device. Power model 114 may provide a power (or thermal) estimate to thermal/power manager 116 and may receive an indication of camera system settings from thermal/power manager 116.

According to aspects of this disclosure, thermal/power manager 116 may adjust one or more operating parameters of the device, including one or more operating parameters of camera system 106 based on the user experience metric (from user experience model 112) and/or power estimation (from power model 114). As noted above, in some instances, thermal/power manager 116 may adjust one or more operating parameters having a relatively low impact on user experience and a relatively high impact on power consumption. In some examples, thermal/power manager 116 may consider context, as received from system hardware or a combination of hardware and software 104, when adjusting the operating parameters.

As noted above, aspects of this disclosure include determining operating parameters for adjustment based on which operating parameters will have a reduced impact on user experience but an increased impact on power consumption. In some examples, thermal/power manager 116 may attempt to achieve an optimal tradeoff having the lowest impact on user experience but the highest impact on power consumption. In some instances, a user experience metric may assist in the determination.

A basis for the above described user experience metric may be founded in the principal of diminishing returns. For example, human senses have limitations. A human may not be able to perceive changes to images or video beyond a certain perceptual limitation. Hence, as an example, a user may not be able to perceive differences in video presented above a temporal frame rate perceptual limitation. Likewise, as another example, a user may not be able to perceive differences in video presented above a spatial resolution perceptual limitation.

Accordingly, the relationship between a user experience and a particular operating parameter may not be linear. That is, above a particular perceptual threshold, increasing an operating parameter such as frame rate, resolution, or a variety of other operating parameters may not produce an enhanced user experience.

Aspects of this disclosure leverage this principal of diminishing returns. For example, by determining an estimation of a user experience, operating parameters may be selected and adjusted based on an impact to user experience. Accordingly, power and/or thermal savings may be achieved while minimizing an impact to user experience.

Figure 4A:
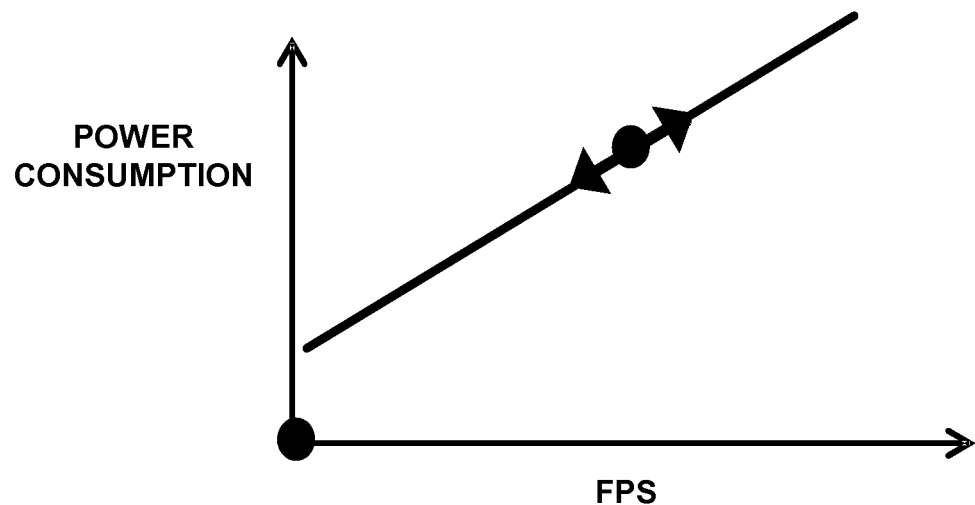
FIGS. 4A and 4B illustrate an example of a relationship between power consumption, a frame rate, and a user experience.
Figure 4B:
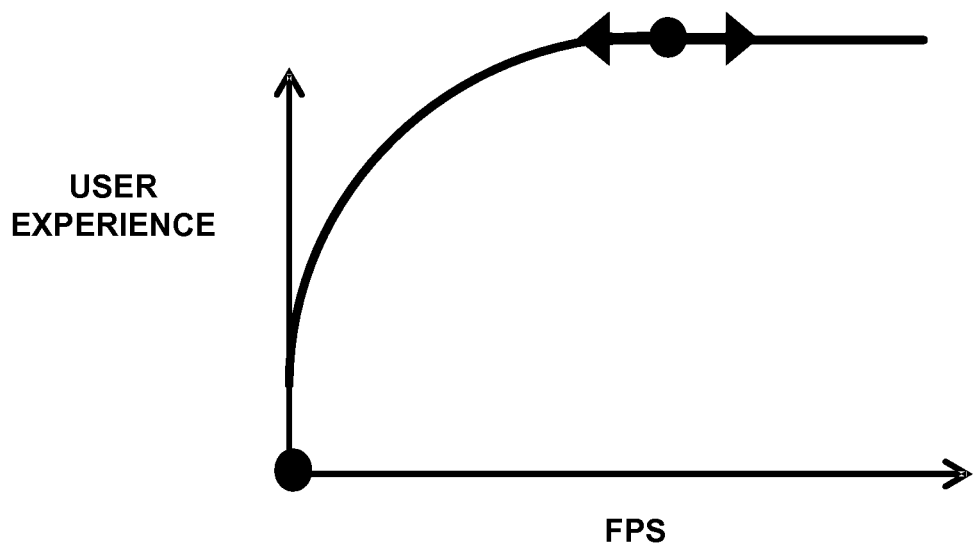

FIGS. 4A and 4B illustrate one example of a relationship between power consumption, a frame rate, and a user experience. The relationship shown in FIGS. 4A and 4B may be used to produce a power density reduction via frame rate scaling. In general, the dots shown in FIGS. 4A and 4B represent particular sample points along the relationship plots (indicated by the arrows).

For example, FIG. 4A illustrates a relationship between a frame rate (FPS) and power consumption (power). In this example, as a device (such as the devices described above with respect to FIGS. 1A-3) increases the frame rate of video captured by a camera, the power consumption of the device also increases.

As shown in FIG. 4B, as the device increases the frame rate (FPS), the user experience also increases. However, increasing the frame rate (FPS) beyond a certain point results in little or no gain in user experience.

A reduced frame rate may directly save active power in camera cores. In addition, a reduced frame rate may reduce power due to bus traffic. In some instances, reducing the frame rate may also reduce processor loading and power dissipation throughout the device (e.g., a System on Chip (SoC) chain).

According to aspects of this disclosure, frame rate may be dynamically controlled to provide graceful power density management. That is, frame rate may be controlled to attain an optimal balance between frame rate and power consumption, taking into account user experience. A customizable tradeoff between power savings and frame rate performance may be attained.

In some examples, active power can be reduced with camera core FPS scaling (e.g., frame skipping), which may provide a moderate level of power density control. In some instances, relatively complex programming and synchronization sequences may be associated with FPS scaling. Granular FPS control may be performed in quantized steps (e.g., resolution: 30 FPS, 29 FPS, 28 FPS, 27 FPS, or a smaller granularity).

In other examples, active power can be reduced with sensor mode control (although not sensors may support this feature). In some instances, sensor mode control may provide relatively better power density savings that the FPS scaling described above.

In still other examples, active power can be reduced with sensor frames per second (FPS) control (e.g., auto-frame rate control). Sensors may support automatic frame rate control via blanking interval stretch. In some instances, FPS control may provide significantly higher power density savings than the examples above. FPS control may provide smooth and linear FPS control via simple sensor programming.

Figure 5A:
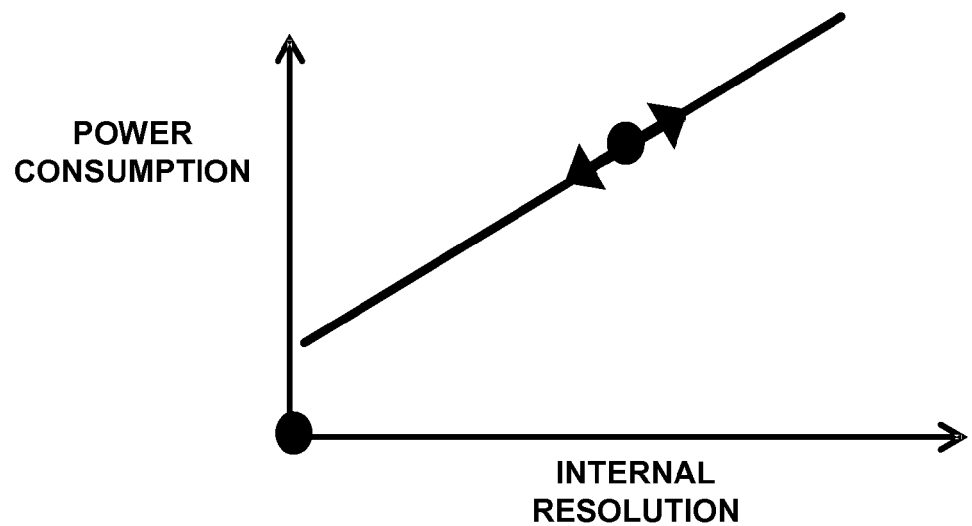
FIGS. 5A and 5B illustrate an example relationship between power consumption, resolution, and user experience.
Figure 5B:
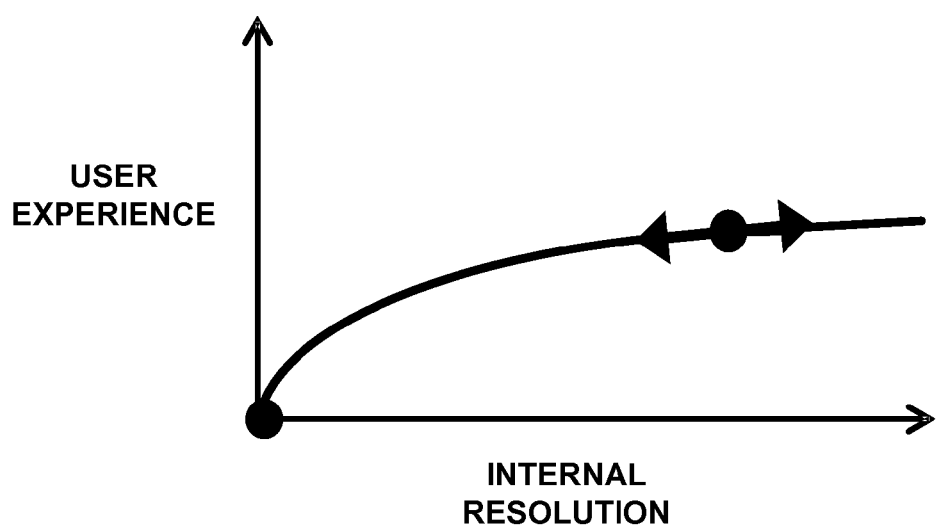

FIGS. 5A and 5B illustrate an example relationship between power consumption, resolution, and user experience. The relationship shown in FIGS. 5A and 5B may be configured to produce a power density reduction via resolution scaling. In general, the dots shown in FIGS. 5A and 5B represent particular sample points along the relationship plots (indicated by the arrows).

For example, FIG. 5A illustrates a relationship between resolution (Internal Res) and power consumption (power). In this example, as a device (such as the devices described above with respect to FIGS. 1A-3) increases the resolution of video captured by a camera, the power consumption of the device also increases.

As shown in FIG. 5B, as the device increases the resolution (Internal Res), the user experience also increases. However, increasing the resolution beyond a certain point results in little or no gain in user experience.

Reduced intermediate (for operations internal to the device, such as image/video processing and/or coding) and output resolutions may directly save active power in camera cores. Intermediate resolution control leverages flows within camera pipeline, and may reduce internal buffer and/or bus traffic, as well as hardware or a combination of hardware and software processing loads. In some examples, reducing resolution may save power and reduce power density by reducing active processing duty cycles and/or bandwidth.

Full dynamic resolution control may enable graceful power density management. That is, resolution control may provide a customizable tradeoff for power savings versus performance (e.g., quality).

In some examples, active power can be reduced by adjusting camera intermediate resolution. The internal camera resolution may be transparent to an application and/or user. Image quality can be recovered to imperceptible loss via internal processing. Reducing internal resolution may provide relatively large power savings due to lighter traffic loads and core active duty cycles. Compensation may be achieved using a chroma downscale followed by a chroma upscale. In some instances, this downscale and upscale process may be used for low-light chroma noise reduction. However, according to aspects of this disclosure, the same or a similar process may be used for power/thermal management.

Additionally or alternatively, active power can be reduced by adjusting camera output resolution. In some instances, adjusting camera output resolution may include application intervention to change the output resolution. The camera output resolution may be managed via the entire imaging pipeline (e.g., camera-composition-display or camera-encode).

Figure 6:
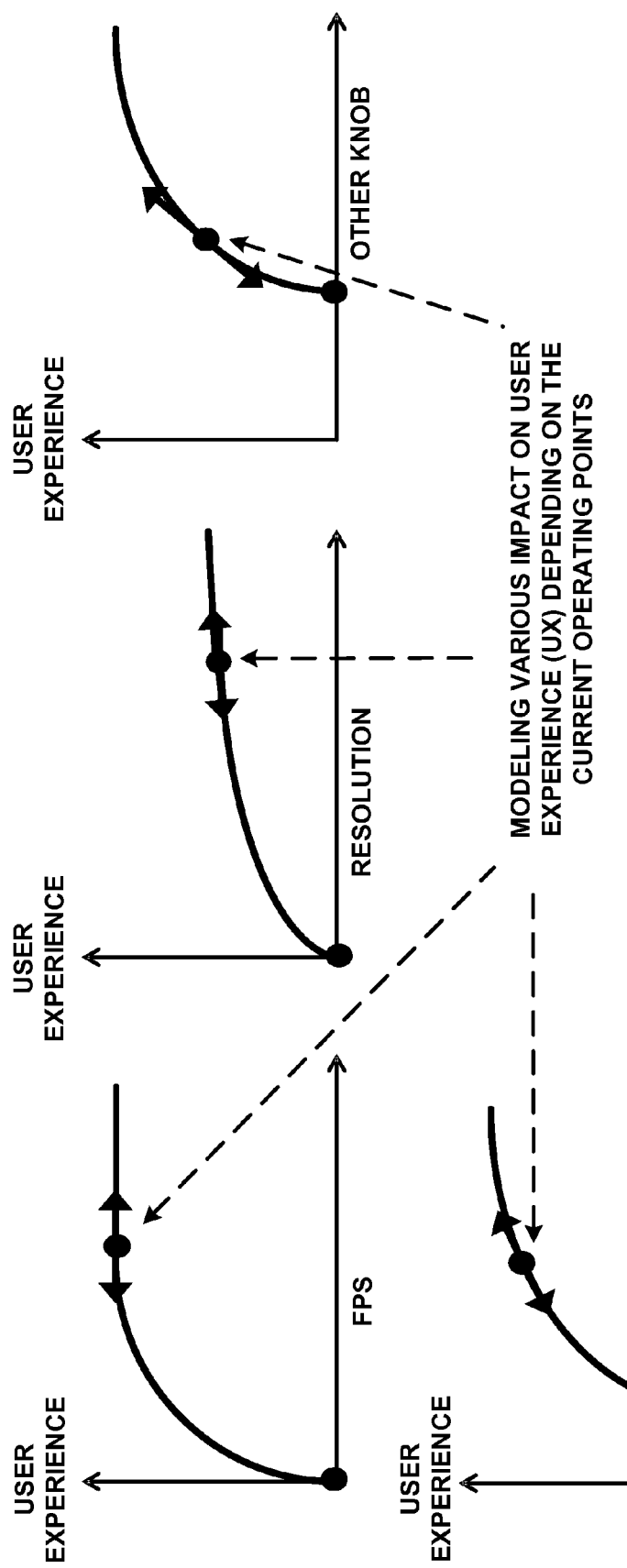
FIG. 6 illustrates example models of a user experience for a variety of operating parameters.

FIG. 6 illustrates example models of user experience for a variety of operating parameters. For example, as noted above, the relationship between a user experience and a particular operating parameter may not be linear. That is, above a particular perceptual threshold, increasing an operating parameter such as frame rate (FPS), resolution, or a variety of other operating parameters (e.g., other knob) may not produce an enhanced user experience.

The example of FIG. 6 illustrates a diminishing user experience return on a processing amount increase. The relationship between operating parameters and a diminishing user experience may be modeled with curved plots (with dots and arrows indicating sample points along the plots). For example, the dots illustrated in FIG. 6 may be operating points, while the plots may model various impacts on user experience (UX) depending on the current operating points. According to aspects of this disclosure, a device (such as the devices described above with respect to FIGS. 1-3) may determine a user experience metric based on the models. As noted above, in some instances, the device may determine a weighted sum of user experience factors. The factors, in some examples, may be weighted based on context associated with the content being captured by a camera of the device.

Figure 7:
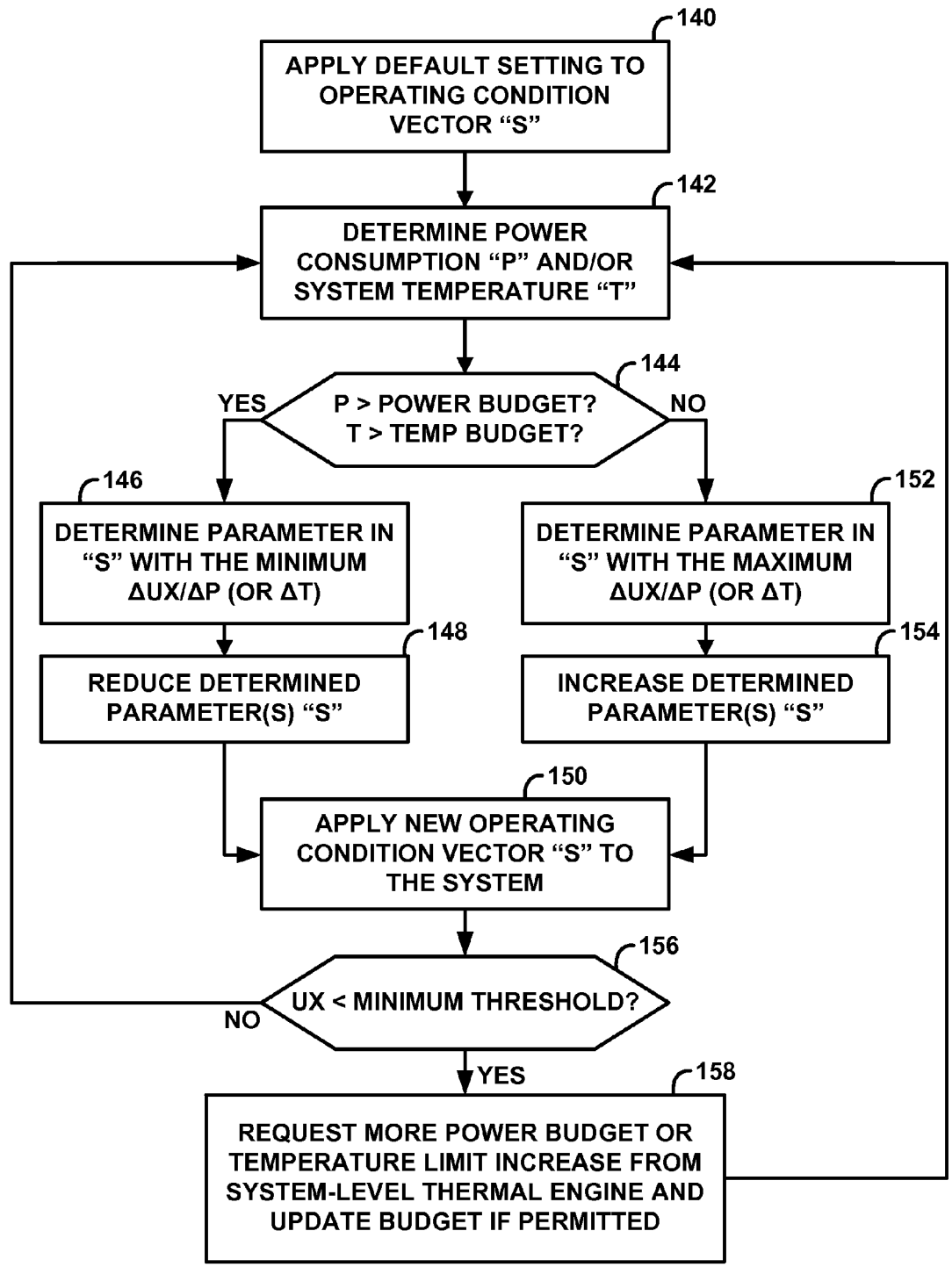
FIG. 7 is a flowchart that illustrates an example process for adjusting an operating parameter of a device based on a user experience metric, according to aspects of this disclosure.

FIG. 7 is a flowchart that illustrates an example process for adjusting an operating parameter of a device based on a user experience metric, according to aspects of this disclosure. The process shown in FIG. 7 may be carried out by the devices and systems shown and described with respect to FIGS. 1-3 above, or by a variety of other electronic devices. FIG. 7 is described with respect to device 40 (FIG. 2) for purposes of illustration.

The process in FIG. 7 refers to controlling power and/or temperature. In some instances, the process of FIG. 7 may be implemented based on power consumption alone (with corresponding power consumption calculations and a power budget, as noted below). In other instances, the process of FIG. 7 may be implemented based on temperature alone (with corresponding temperature measurement(s) and a temperature budget, as noted below). In still other instances, the process of FIG. 7 may be implemented based on a combination of power consumption and temperature. In such instances, both power consumption and temperature may be monitored. In addition, a power budget and a temperature budget may both be used to determine when to adjust operating parameters. That is, a predetermined algorithm may specify a priority between controlling power consumption and controlling temperature.

Device 40 may apply a default setting to an operating condition (also referred to as an operating parameter) vector S (140). Device 40 may then determine power consumption (P) of one or more components of device 40 (such as, for example, an image processor or other components of camera system 76) and/or a system temperature (T) of device 40 (142). In some examples, the power consumption may be composed of a number of power measurements from individual components of device 40. Likewise, in some examples, the system temperature may be composed of a number of temperature measurements from individual components of device 40.

Device 40 may determine whether the power consumption (P) exceeds a predetermined power budget and/or whether the temperature exceeds a predetermined temperature limit (T) (144). If the power consumption (P) exceeds the power budget and/or the temperature (T) exceeds the temperature limit (the yes branch of step 144), device 40, e.g., thermal/power manager 80 of device 40, may determine one or more operating parameters in vector S that, when adjusted, produce a minimum user experience ratio (delta UX/delta P (or delta T)) (146). For example, device 40 may determine the user experience ratio based on an estimated change in user experience (delta user experience) as well as an estimated change in power consumption (delta power, or, in the case of temperature, delta temperature).

As noted above, device 40 may estimate the change in user experience using a user experience metric, which may be composed of one or more user experience models. In addition, device 40 may estimate the change in power consumption (or temperature) using one or more power or temperature models. By reducing and in some cases minimizing the user experience ratio (e.g., delta user experience divided by delta power (or delta temperature)), device 40 may select the operating parameter(s) that have a relatively low impact (e.g., a minimum impact) on the user experience but a relatively high impact (e.g., a maximum impact) on power (or temperature) savings.

Device 40 may then reduce the determined parameter(s) in vector S (148). In addition, device 40 may apply the new operating condition vector S to the system, thereby adjusting one or more operating parameters of the device (150).

Returning to step 144, if the power consumption (P) is lower than the power budget and/or the temperature (T) is lower than the temperature limit (the no branch of step 144), device 40 may determine one or more operating parameters in vector S that, when adjusted, produce a greater (e.g., a maximum) user experience ratio (delta UX/delta P (or delta T)) (152). For example, device 40 may determine the user experience ratio based on an estimated change in user experience (delta user experience) as well as an estimated change in power consumption (delta power, or, in the case of temperature, delta temperature).

Again, device 40 may estimate the change in user experience using a user experience metric, which may be composed of one or more user experience models. In addition, device 40 may estimate the change in power consumption (or temperature) using one or more power or temperature models. By increasing (e.g., maximizing) the user experience ratio (e.g., delta user experience divided by delta power (or delta temperature)), the device may select the operating parameter(s) that have a relatively large (e.g., maximum) impact on the user experience but a relatively low (e.g., minimized) power (or temperature) change. That is, device 40 selects one or more operating parameters that, when adjusted, produce an increase in user experience but do not drastically increase the power consumption or temperature of device 40.

Device 40 may then increase the determined parameter(s) in vector S (154). In addition, device 40 may apply the new operating condition vector S to the system, thereby adjusting one or more operating parameters of the device (150).

After adjusting the one or more operating parameters of the device (150), e.g., by applying the new operating condition vector S to the system, device 40 may determine whether the user experience (UX) is greater than a minimum user experience threshold (156). If the user experience (UX) is less than the minimum (the no branch of step 156), device 40 may return to step 142 for additional adjustment of operating parameters to increase the user experience. If the user experience (UX) is greater than or equal to the minimum (the yes branch of step 156), device 40 may request additional power budget or a temperature limit increase from a system level thermal engine and update the budget or limit if permitted (158). In other examples, device 40 may continue to monitor the user experience (UX) until the user experience falls below the minimum user experience threshold.

It should be understood that the steps shown and described with respect to FIG. 7 are provided as merely one example. That is, the steps of the method of FIG. 7 need not necessarily be performed in the order shown in FIG. 7, and fewer, additional, or alternative steps may be performed.

Figure 8:
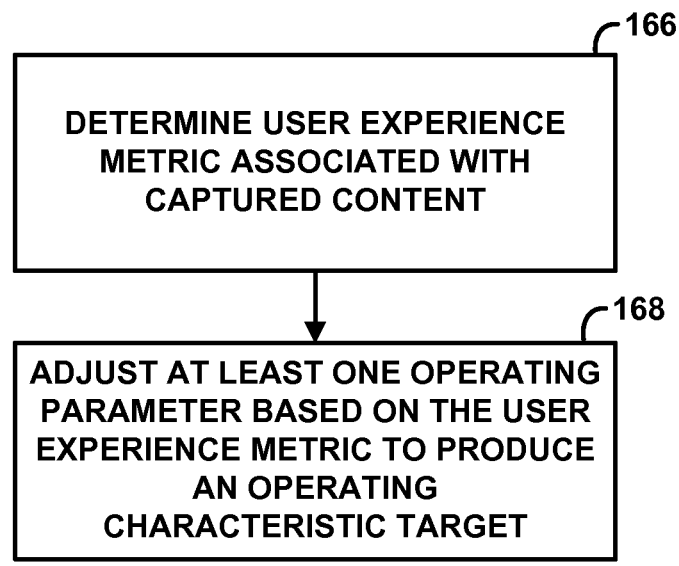
FIG. 8 is a flowchart that illustrates another example process for adjusting an operating parameter of a device based on a user experience metric, according to aspects of this disclosure.

FIG. 8 is a flowchart that illustrates another example process for adjusting an operating parameter of a device based on a user experience metric, according to aspects of this disclosure. The process shown in FIG. 8 may be carried out by the devices and systems shown and described with respect to FIGS. 1-3 above, or by a variety of other electronic devices. FIG. 8 is described with respect to device 40 (FIG. 2) for purposes of illustration.

Device 40 may determine a user experience metric associated with content captured by a camera of the electronic device (166). According to aspects of this disclosure, device 40 may automatically determine the user experience metric. For example, device 40 may automatically determine the user experience metric without input from a user.

Device 40 may, in some examples, determine a user experience metric by applying a user experience model to each operating parameter of device 40 to generate one or more user experience factors. Device 40 may calculate a sum of the one or more user experience factors. In some instances, calculating the sum user experience factors may include applying, based on context associated with the content, one or more weighting factors to one or more of the user experience factors to produce one or more weighted user experience factors. Device 40 may then calculate a weighted sum of the weighted user experience factors.

Device 40 also adjusts, based on an estimated change to the determined user experience metric, at least one operating parameter of the device to produce an operating characteristic target (168). As noted above with respect to FIG. 3, example operating parameters include one or more of a frame rate, a resolution, a software application operating at the device, one or more operating parameters associated with one or more hardware components of a camera sub-system that includes the camera, a sensor for the camera capturing the content, or the like.

According to aspects of this disclosure, device 40 may adjust the operating parameter based on context of content captured by the camera. Device 40 may adjust the operating parameter based on whether the content includes, as examples, a presence of a face in the content, presence of a skin hue in the content, a frequency of the content, an estimation of motion associated with the content, a brightness of the content, a focal length of the content, or the like. In an example for purposes of illustration, assume that the operating parameters being adjusted include resolution and frame rate. In this example, device 40 may adjust the resolution more (or less than) the frame rate, depending on the content being captured.

In an example, device 40 may determine whether a face is present in captured content as context. In this example, device 40 may apply a user experience model to the frame rate to generate a frame rate user experience factor and apply a user experience model to the resolution to generate a resolution user experience factor. Device 40 may apply a first weighting factor to the frame rate user experience factor and a second weighting factor to the resolution user experience factor, where the first weighting factor is less than the second weighting factor.

In another example, device 40 may determine whether a hue associated with a skin tone is present in captured content as context. In this example, device 40 may apply a user experience model to the frame rate to generate a frame rate user experience factor and apply a user experience model to the resolution to generate a resolution user experience factor. Device 40 may apply a first weighting factor to the frame rate user experience factor and a second weighting factor to the resolution user experience factor, where the first weighting factor is less than the second weighting factor.

In another example, device 40 may determine a frequency of the captured content as context. In this example, device 40 may apply a user experience model to the frame rate to generate a frame rate user experience factor and apply a user experience model to the resolution to generate a resolution user experience factor. Device 40 may apply a first weighting factor to the frame rate user experience factor and a second weighting factor to the resolution user experience factor, where the first weighting factor is less than the second weighting factor when the frequency exceeds a predetermined threshold.

In another example, device 40 may determine an estimation of motion in captured content as context. In this example, device 40 may apply a user experience model to the frame rate to generate a frame rate user experience factor and apply a user experience model to the resolution to generate a resolution user experience factor. Device 40 may apply a first weighting factor to the frame rate user experience factor and a second weighting factor to the resolution user experience factor, where the first weighting factor is greater than the second weighting factor when the estimation of motion exceeds a predetermined threshold.

In another example, device 40 may determine an estimation of brightness in captured content as context. In this example, device 40 may apply a user experience model to the frame rate to generate a frame rate user experience factor and apply a user experience model to the resolution to generate a resolution user experience factor. Device 40 may apply a first weighting factor to the frame rate user experience factor and a second weighting factor to the resolution user experience factor, where the first weighting factor is greater than the second weighting factor when the estimation of brightness exceeds a predetermined threshold.

In another example, device 40 may determine a focal length of content as context. In this example, device 40 may apply a user experience model to the frame rate to generate a frame rate user experience factor and apply a user experience model to the resolution to generate a resolution user experience factor. Device 40 may apply a first weighting factor to the frame rate user experience factor and a second weighting factor to the resolution user experience factor, where the first weighting factor is less than the second weighting factor when the focal length is less than a predetermined threshold.

In some examples, according to aspects of this disclosure, the device may adjust the operating parameters to minimize the impact to user experience. In addition, the device may intelligently select one or more of the parameters relative to other parameters based on their impact to user experience. For example, the device may select one or more operating parameters from a plurality of operating parameters to minimize a decrease in the user experience metric relative to selecting another of the operating parameters.

Hence, in some instances, the operating characteristic target may be a predetermined power budget (which may also be referred to as a power limit or power threshold). In such instances, when a power draw of one or more components of device 40 exceeds the predetermined power budget, device 40 may adjust the at least one operating parameters by determining one or more operating parameters of a plurality of parameters that, when adjusted, produce the greatest change in the power draw of device 40 and the smallest change in the user experience metric relative to other operating parameters of the plurality.

Likewise, in some instances, the operating characteristic target may be a predetermined temperature limit (which may also be referred to as a thermal limit or thermal threshold). In such instances, when a temperature of one or more components of device 40 exceeds the predetermined temperature limit, device 40 may adjust the at least one operating parameters by determining one or more operating parameters of a plurality of parameters that, when adjusted, produce the greatest change in the temperature of device 40 and the smallest change in the user experience metric relative to other operating parameters of the plurality.

In some examples, according to aspects of this disclosure, device 40 may adjust the at least one operating parameter based on a ratio of an estimated change in the operating characteristic to the estimated change to the determined user experience.

Device 40 may, in some examples, adjust the at one operating parameter based on a weighted sum of user experience factors, as noted above. In an example for purposes of illustration, assume operating parameters include a frame rate and a resolution. Assume further that the context associated with the content includes at least one of a presence of a face in the content, presence of a skin hue in the content, a frequency of the content, an estimation of motion associated with the content, a brightness of the content, or a focal length of the content. In this example, applying the user experience model to each of the operating parameters may include applying a user experience model to the frame rate to generate a frame rate user experience factor and applying the user experience model to the resolution to generate a resolution user experience factor. Device 40 may apply a first weighting factor to the frame rate user experience factor and a second, different weighting factor to the resolution user experience factor based on the context.

It should be understood that the steps shown and described with respect to FIG. 8 are provided as merely one example. That is, the steps of the method of FIG. 8 need not necessarily be performed in the order shown in FIG. 8, and fewer, additional, or alternative steps may be performed.

In this way, the techniques of this disclosure may provide one or more advantages over other power and/or temperature control techniques. For example, a device may typically perform clock throttling (frequency limiting) when a temperature becomes higher than a threshold. According to aspects of this disclosure, the device may control image capture resolution/frame rate/other controls (image workload control) rather than just clock control.

A device may typically have many different clocks for various function blocks. Clock throttling may be applied to a few function blocks achieving only partial clock throttling and partial power reduction (and none for some function blocks). According to aspects of this disclosure, the device may have comprehensive control over the full camera system flow including, for example, an external camera sensor module, image processing components and memory read/write.

A device may typically perform frame rate control via frame skip. According to aspects of this disclosure, the device may have finer frame rate control via simpler interfaces for user experience aware thermal manager (e.g., using automatic frame rate control via blanking interval stretch), which may produce a significantly higher power savings.

A device may typically have no consideration for the impact to user experience when adjusting for power or temperature overages. According to aspects of this disclosure, as described above, the device may balance degradation on image resolution/frame rate/other operating parameters based on a user experience model that considers the impact to user experience.

A device may typically have passive controls with respect to a power budget (e.g., no power budget negotiation). According to aspects of this disclosure, if the quantified image quality (e.g., user experience) resolution/frame rate/other operating parameters become lower than a threshold, the device may reject the power reduction request from thermal engine or request more power budget from it.

It should also be understood that, depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

Moreover, in one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol.

In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

What is claimed is:

1. A method comprising:
   determining, by an electronic device, a quality metric that provides an estimation of a user experience associated with content captured by at least one camera of the electronic device; and
   determining a power draw of one or more components of the device relative to a predetermined power budget;
   adjusting a plurality of operating parameters of the device based on the predetermined power budget, wherein adjusting the plurality of operating parameters comprises:
      based on the power draw exceeding the predetermined power budget, determining one or more operating parameters of the plurality of operating parameters that, when adjusted, produce the greatest change in the power draw and the smallest change in the quality metric relative to at least one other operating parameter of the plurality of operating parameters; and
      adjusting the determined one or more operating parameters.

2. The method of claim 1, wherein adjusting the plurality of operating parameters further comprises adjusting at least one operating parameter based on a context of the content.

3. The method of claim 2,
   wherein the at least one operating parameter comprises a frame rate and a resolution, and
   wherein adjusting the at least one operating parameter comprises adjusting the frame rate one of more or less than the resolution based on the context.

4. The method of claim 2, wherein the context comprises at least one of a presence of a face in the content, presence of a skin hue in the content, a frequency of the content, an estimation of motion associated with the content, a brightness of the content, or a focal length of the content.

5. The method of claim 1, wherein the at least one camera comprises a plurality of cameras and wherein adjusting the plurality of operating parameters of the device comprises separately adjusting at least one operating parameter for each camera of the plurality of cameras.

6. The method of claim 1, wherein adjusting the determined one or more operating parameters comprises adjusting the determined one or more operating parameters based on a ratio of an estimated change in the power draw to the estimated change to the quality metric.

7. The method of claim 1, wherein determining the quality metric further comprises:
   applying a user experience model to each of the plurality of operating parameters to generate a plurality of user experience factors;
   calculating a sum of the plurality of user experience factors; and
   wherein adjusting the determined one or more operating parameters comprises adjusting the determined one or more operating parameters based at least partially on the calculated sum.

8. The method of claim 7, wherein calculating the sum of the plurality of user experience factors further comprises:
   applying, based on context associated with the content, one or more weighting factors to one or more of the user experience factors to produce one or more weighted user experience factors;
   calculating a weighted sum of the weighted user experience factors; and
   wherein adjusting the determined one or more operating parameters comprises adjusting the determined one or more operating parameters based at least partially on the calculated weighted sum.

9. The method of claim 8,
   wherein the at least one operating parameter comprises a frame rate and a resolution,
   wherein the context associated with the content comprises at least one of a presence of a face in the content, a presence of a skin hue in the content, a frequency of the content, an estimation of motion associated with the content, a brightness of the content, or a focal length of the content, wherein applying the user experience model to each of the at least one operating parameters comprises applying the user experience model to the frame rate to generate a frame rate user experience factor and applying the user experience model to the resolution to generate a resolution user experience factor, and wherein applying the one or more weighting factors comprises applying a first weighting factor to the frame rate user experience factor and a second, different weighting factor to the resolution user experience factor.

10. The method of claim 1, wherein the plurality of operating parameters comprise at least two of a frame rate, a resolution, one or more operating parameters associated with one or more hardware components of at least one camera sub-system that includes the at least one camera, or at least one sensor for the at least one camera capturing the content.

11. An electronic device comprising:
at least one camera; and
one or more processors configured to:
determine a quality metric that provides an estimation of a user experience associated with content captured by the at least one camera of the electronic device;
determine a power draw of one or more components of the device relative to a predetermined power budget and
adjust a plurality of operating parameters of the device based on the predetermined power budget, wherein to adjust the plurality of operating parameters, the one or more processors are configured to, based on the power draw exceeding the predetermined power budget, determine one or more operating parameters of the plurality of operating parameters that, when adjusted, produce the greatest change in the power draw and the smallest change in the quality metric relative to at least one other operating parameter of the plurality of operating parameters, and adjust the determined one or more operating parameters.

12. The electronic device of claim 11, wherein to adjust the plurality of operating parameters, the one or more processors are configured to adjust the at least one operating parameter based on a context of the content.

13. The electronic device of claim 12,
wherein the at least one operating parameter comprises a frame rate and a resolution, and
wherein to adjust the at least one operating parameter, the one or more processors are configured to adjust the frame rate one of more or less than the resolution based on the context.

14. The electronic device of claim 12, wherein the context comprises at least one of a presence of a face in the content, presence of a skin hue in the content, a frequency of the content, an estimation of motion associated with the content, a brightness of the content, or a focal length of the content.

15. The electronic device of claim 11, wherein the at least one camera comprises a plurality of cameras and wherein to adjust the plurality of operating parameters of the device, the one or more processors are configured to separately adjust at least one operating parameter for each camera of the plurality of cameras.

16. The electronic device of claim 11, wherein to adjust the determined one or more operating parameters, the one or more processors are configured to adjust the determined one or more operating parameters based on a ratio of an estimated change in the power draw to the estimated change to the quality metric.

17. The electronic device of claim 11, wherein to determine the quality metric, the one or more processors are configured to:
apply a user experience model to each of the plurality of operating parameters to generate a plurality of user experience factors;
calculate a sum of the plurality of user experience factors; and
wherein to adjust the determined one or more operating parameters, the one or more processors are configured to adjust the determined one or more operating parameters based at least partially on the calculated sum.

18. The electronic device of claim 17, wherein to calculate the sum of the plurality of user experience factors, the one or more processors are configured to:
apply, based on context associated with the content, one or more weighting factors to one or more of the user experience factors to produce one or more weighted user experience factors;
calculate a weighted sum of the weighted user experience factors; and
wherein to adjust determined one or more operating parameters, the one or more processors are configured to adjust the determined one or more operating parameters based at least partially on the calculated weighted sum.

19. The electronic device of claim 18,
wherein the at least one operating parameter comprises a frame rate and a resolution,
wherein the context associated with the content comprises at least one of a presence of a face in the content, a presence of a skin hue in the content, a frequency of the content, an estimation of motion associated with the content, a brightness of the content, or a focal length of the content,
wherein to apply the user experience model to each of the at least one operating parameters, the one or more processors are configured to apply the user experience model to the frame rate to generate a frame rate user experience factor and apply the user experience model to the resolution to generate a resolution user experience factor, and
wherein to apply the one or more weighting factors, the one or more processors are configured to apply a first weighting factor to the frame rate user experience factor and a second, different weighting factor to the resolution user experience factor.

20. The electronic device of claim 11, wherein the plurality of operating parameters comprise at least two of a frame rate, a resolution, one or more operating parameters associated with one or more hardware components of at least one camera sub-system that includes the at least one camera, or at least one sensor for the at least one camera capturing the content.

21. An apparatus comprising:
means for determining a quality metric that provides an estimation of a user experience associated with content captured by at least one camera of an electronic device;
means for determining a power draw of one or more components of the device relative to a predetermined power budget and
means for adjusting a plurality of operating parameters of the device based on the predetermined power budget, wherein the means for adjusting the plurality of operating parameters comprises:

means for determining, based on the power draw exceeding the predetermined power budget, one or more operating parameters of the plurality of operating parameters that, when adjusted, produce the greatest change in the power draw and the smallest change in the quality metric relative to at least one other operating parameter of the plurality of operating parameters; and means for adjusting the determined one or more operating parameters.

22. A non-transitory computer-readable medium having instructions stored thereon that, when executed, cause one or more processors to:
    determine a quality metric that provides an estimation of a user experience associated with content captured by at least one camera of an electronic device;
    determine a power draw of one or more components of the device relative to a predetermined power budget; and
    adjust a plurality of operating parameters of the device based on the predetermined power budget, wherein to adjust the plurality of operating parameters, the instructions cause the one or more processors to:
        based on the power draw exceeding the predetermined power budget, determine one or more operating parameters of the plurality of operating parameters that, when adjusted, produce the greatest change in the power draw and the smallest change in the quality metric relative to at least one other operating parameter of the plurality of operating parameters; and
        adjust the determined one or more operating parameters.

23. A method comprising:
    determining, by an electronic device, a quality metric that provides an estimation of a user experience associated with content captured by at least one camera of the electronic device;
    determining a temperature of one or more components of the device relative to the predetermined temperature limit; and
    adjusting a plurality of operating parameters of the device based on the predetermined power budget, wherein adjusting the plurality of operating parameters comprises:
        based on the determined temperature exceeding the predetermined temperature limit, determining one or more operating parameters of the plurality of operating parameters that, when adjusted, produce the greatest change in temperature of the one or more components of the device and the smallest change in the quality metric relative to at least one other operating parameter of the plurality of operating parameters; and
        adjusting the determined one or more operating parameters.

24. The method of claim 23, wherein adjusting the plurality of operating parameters further comprises adjusting at least one operating parameter based on a context of the content.

25. The method of claim 23,
    wherein the at least one operating parameter comprises a frame rate and a resolution, and
    wherein adjusting the at least one operating parameter comprises adjusting the frame rate one of more or less than the resolution based on the context.

26. The method of claim 24, wherein the context comprises at least one of a presence of a face in the content, presence of a skin hue in the content, a frequency of the content, an estimation of motion associated with the content, a brightness of the content, or a focal length of the content.

27. The method of claim 23, wherein the at least one camera comprises a plurality of cameras and wherein adjusting the plurality of operating parameters of the device comprises separately adjusting at least one operating parameter for each camera of the plurality of cameras.

28. An electronic device comprising:
    at least one camera; and
    one or more processors configured to:
        determine a quality metric that provides an estimation of a user experience associated with content captured by the at least one camera of the electronic device;
        determine a temperature of one or more components of the device relative to the predetermined temperature limit; and
        adjust a plurality of operating parameters of the device based on the predetermined power budget, wherein to adjust the plurality of operating parameters, the one or more processors are configured to determine, based on the temperature exceeding the predetermined temperature limit, one or more operating parameters of the plurality of operating parameters that, when adjusted, produce the greatest change in temperature of the one or more components of the device and the smallest change in the quality metric relative to at least one other operating parameter of the plurality of operating parameters and adjust the determined one or more operating parameters.

29. The electronic device of claim 28, wherein adjusting the plurality of operating parameters further comprises adjusting at least one operating parameter based on a context of the content.

30. The electronic device of claim 29,
    wherein the at least one operating parameter comprises a frame rate and a resolution, and
    wherein to adjust the at least one operating parameter, the one or more processors are configured to adjust the frame rate one of more or less than the resolution based on the context.

31. The electronic device of claim 29, wherein the context comprises at least one of a presence of a face in the content, presence of a skin hue in the content, a frequency of the content, an estimation of motion associated with the content, a brightness of the content, or a focal length of the content.

32. The electronic device of claim 28, wherein the at least one camera comprises a plurality of cameras and wherein adjusting the plurality of operating parameters of the device comprises separately adjusting at least one operating parameter for each camera of the plurality of cameras.

* * * * *